（12）United States Patent
Kondo (10) Patent No.: US 11,161,553 B2
(45) Date of Patent: Nov. 2, 2021

(54) VEHICLE BODY FRONT STRUCTURE

(71) Applicant: HONDA MOTOR CO., LTD., Tokyo (JP)

(72) Inventor: Takehiro Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 16/605,512

(22) PCT Filed: May 31, 2018

(86) PCT No.: PCT/JP2018/020948
§ 371 (c)(1),
(2) Date: Oct. 16, 2019

(87) PCT Pub. No.: WO2019/003793
PCT Pub. Date: Jan. 3, 2019

(65) Prior Publication Data
US 2020/0122777 A1 Apr. 23, 2020

(30) Foreign Application Priority Data
Jun. 28, 2017 (JP) .............................. JP2017-126300

(51) Int. Cl.
*B62D 25/08* (2006.01)

(52) U.S. Cl.
CPC .................................. *B62D 25/088* (2013.01)

(58) Field of Classification Search
CPC ............... B62D 25/088; B62D 25/085; B60G 2204/128; B60G 2206/41; B60G 13/003
See application file for complete search history.

(56) References Cited

U.S. PATENT DOCUMENTS

| 5,031,958 A | 7/1991 | Fujita et al. |
| 2005/0073174 A1 | 4/2005 | Yamaguchi et al. |

(Continued)

FOREIGN PATENT DOCUMENTS

| CN | 1605523 | 4/2005 |
| CN | 1927623 | 3/2007 |

(Continued)

OTHER PUBLICATIONS

International Search Report and Written Opinion for International Application Serial No. PCT/JP2018/020948 dated Aug. 21, 2018, 8 pages.

(Continued)

*Primary Examiner* — Lori L Lyjak
(74) *Attorney, Agent, or Firm* — Amin, Turocy & Watson, LLP (57) ABSTRACT

A vehicle body front structure includes a damper housing and a cross member. The cross member is connected to the damper housing to form a closed cross section with the damper housing and the cross member. The closed cross section extends in a vertical direction across a front side frame and an upper member. The cross member has a first attachment portion. A mounting member supporting a drive source of a vehicle is attached to the first attachment portion. The cross member is formed such that a distance dimension from the damper housing decreases downward from the first attachment portion in the closed cross section.

6 Claims, 10 Drawing Sheets

(56) References Cited

U.S. PATENT DOCUMENTS

| | | | |
|---|---|---|---|
| 2006/0006699 A1 | 1/2006 | Matsuyama et al. | |
| 2013/0221708 A1* | 8/2013 | Hanakawa | B62D 25/088 296/193.09 |
| 2015/0054312 A1* | 2/2015 | Hisazumi | B62D 25/082 296/193.09 |
| 2016/0031484 A1 | 2/2016 | Nakauchi et al. | |
| 2017/0088073 A1 | 3/2017 | Takeda | |

FOREIGN PATENT DOCUMENTS

| | | |
|---|---|---|
| CN | 102951207 | 3/2013 |
| CN | 103587366 | 2/2014 |
| CN | 105189263 | 12/2015 |
| CN | 105522881 | 4/2016 |
| CN | 106553697 | 4/2017 |
| EP | 1762437 | 3/2007 |
| JP | 02-246877 | 10/1990 |
| JP | 2009-001037 | 1/2009 |
| JP | 2015-077819 | 4/2015 |
| JP | 2016-032961 | 3/2016 |
| JP | 2017-007606 | 1/2017 |
| JP | 2017-065548 | 4/2017 |

OTHER PUBLICATIONS

Chinese Office Action for Chinese Patent Application No. 201880024615.4 dated May 14, 2021.

* cited by examiner

FIG. 12

VEHICLE BODY FRONT STRUCTURE

TECHNICAL FIELD

The present invention relates to a vehicle body front structure.

Priority is claimed on Japanese Patent Application No. 2017-126300, filed Jun. 28, 2017, the contents of which are incorporated herein by reference.

BACKGROUND ART

A vehicle body front structure in which a damper housing is provided between a front side frame and an upper member, and a damper base is provided at an upper end portion of the damper housing is known. A cross member is provided at a front end portion of the damper housing. An upper end portion of a damper is attached to the damper base, and a front wheel is supported at a lower end portion thereof.

By providing the cross member at the front end portion of the damper housing, strength (rigidity) of the damper housing is secured, so that the damper can be favorably supported by the damper base (for example, see Patent Document 1).

CITATION LIST

Patent Literature

[Patent Literature 1] Japanese Unexamined Patent Application, First Publication No. 2017-7606

SUMMARY OF INVENTION

Technical Problem

There is a type of vehicle body front structure in which a mounting portion for supporting a drive source of a vehicle is provided at a portion of a damper housing where a cross member is provided. The drive source includes a power unit and a motor in which an engine and a transmission are integrated.

By supporting the drive source with the mounting portion, a load from the drive source is input to the portion of the damper housing where the cross member is provided via the mounting portion. Specifically, the load of the drive source is input from two directions, that is, from a longitudinal direction of the vehicle body with respect to the portion where the cross member is provided and from a direction orthogonal to a surface of the portion where the cross member is provided.

For this reason, it is required to put into practice a technology which can secure strength against the load of the drive source input from the two directions to support the drive source at the portion of the damper housing where the cross member is provided.

An embodiment according to the present invention has been made in consideration of such circumstances, and it is an object of the present invention to provide a vehicle body front structure which can support a drive source at a portion of a damper housing where a cross member is provided.

Solution to Problem

In order to solve the above problem, the present invention has adopted the following aspects.

(1) A vehicle body front structure according to one aspect of the present invention is a vehicle body front structure including a front side frame extending in a longitudinal direction of a vehicle body, an upper member which is disposed outward from the front side frame in a vehicle width direction and extends in the longitudinal direction of the vehicle body, a damper housing disposed between the front side frame and the upper member, and a cross member which is connected to the damper housing to continuously form a closed cross section together with the damper housing and extends in a vertical direction across the front side frame and the upper member, in which the cross member has an attachment portion to which a mounting member supporting a drive source of a vehicle is attached, and is formed such that a distance dimension from the damper housing decreases downward from the attachment portion in the closed cross section.

According to the above aspect (1), in the closed cross section of the damper housing and the cross member, the cross member is formed such that the distance dimension from the damper housing decreases downward from the attachment portion. Therefore, strength of the cross member against a load applied in the longitudinal direction (a direction intersecting the cross member) of the vehicle body can be increased at a portion where the distance dimension from the damper housing has decreased.

On the other hand, strength of the cross member against a load applied to the damper housing can be increased at a portion where the distance dimension from the damper housing is greater.

Therefore, the mounting member can be firmly supported on the mounting portion of the cross member. Thus, the drive source can be supported at the portion of the damper housing where the cross member is provided.

(2) In the above aspect (1), the closed cross section may be formed from a frame connection portion between the damper housing and the front side frame toward the upper member.

Here, the front side frame is a member which becomes a framework member of the vehicle body. Therefore, the front side frame is a member having relatively high strength. According to the above aspect (2), the closed cross section can be formed of the front side frame having relatively high strength. Thus, in the cross member, the load applied in the longitudinal direction (the direction intersecting the cross member) of the vehicle body and the load applied toward the damper housing can be transmitted to the front side frame.

In particular, by forming the closed cross section continuously with the front side frame, the closed cross section (that is, the cross member) can be reinforced by the front side frame.

As a result, the strength against the load applied in the longitudinal direction of the vehicle body (the direction intersecting the cross member) and the load applied to the damper housing can be increased.

(3) In the above aspect (1) or (2), the damper housing may be disposed outward from the cross member in the vehicle width direction to have a lower end portion attached to the front side frame, and may have a bead extending in the vertical direction at the lower end portion.

According to the above aspect (3), the lower end portion of the damper housing is attached to the front side frame, and the bead extending in the vertical direction is formed at the lower end portion of the damper housing. Therefore, a load in the vertical direction can be supported by the bead. Thus, strength of the damper housing against the load in the vertical direction can be enhanced by the bead.

In addition, by forming the bead at the lower end portion of the damper housing, an interval can be formed between the cross member and the bead. Thus, when electrostatic painting on the inside of the closed cross section formed by the cross member and the damper housing is performed, an electropaint can favorably enter into the inside of the closed cross section through the interval formed between the cross member and the bead.

(4) In any one of the above aspects (1) to (3), a damper housing extension portion which is provided in front of the damper housing in the vehicle body and is connected to the damper housing may be included, the cross member may include a front flange projecting forward in the vehicle body, and the front flange may be connected to a housing connection portion between the damper housing and the damper housing extension portion.

According to the above aspect (4), by connecting the damper housing and the damper housing extension portion, the housing connection portion consisting of two members can be a portion having a relatively high strength. By connecting the front flange of the cross member to the housing connection portion having a relatively high strength, the cross member can be firmly supported by the housing connection portion consisting of two members.

Thus, strength of the cross member against the load applied in the longitudinal direction of the vehicle body (the direction intersecting the cross member) or the load applied to the damper housing can be enhanced.

(5) In the above aspect (4), the cross member may include a rear flange which projects rearward in the vehicle body and is connected to the damper housing, and may have a raised portion on one of the front flange and the rear flange.

According to the above aspect (5), the raised portion is formed on one of the front flange and the rear flange. Therefore, an interval can be secured between the raised portion and the damper housing. Alternatively, an interval can be secured between the raised portion and the connection portion. Thus, when electrostatic painting on the inside of the closed cross section formed by the cross member and the damper housing is performed, an electropaint can favorably enter into the inside of the closed cross section through the secured interval.

Also, the raised portion is formed on one of the front flange and the rear flange. Therefore, the other of the front flange and the rear flange can be connected in a state of being formed continuously with the damper housing or the connection portion.

Thus, reduction of strength caused by forming the raised portion in one flange can be inhibited by forming and continuously connecting the other flange.

Advantageous Effects of Invention

According to the aspects of the present invention, in the closed cross section of the damper housing and the cross member, the cross member is formed such that the distance dimension from the damper housing decreases downward from the attachment portion. Thus, the drive source can be supported at the portion of the damper housing where the cross member is provided.

DESCRIPTION OF EMBODIMENTS

One embodiment of the present invention will be described with reference to the drawings. In the drawings, an arrow FR indicates forward in a vehicle, an arrow UP indicates upward in the vehicle, and an arrow LH indicates leftward in the vehicle.

Also, a vehicle body front structure 12 has a substantially laterally symmetrical configuration. Therefore, left side components and right side components are denoted by the same reference signs, and the left side components will be described with the description of the right side components omitted.

Figure 1:
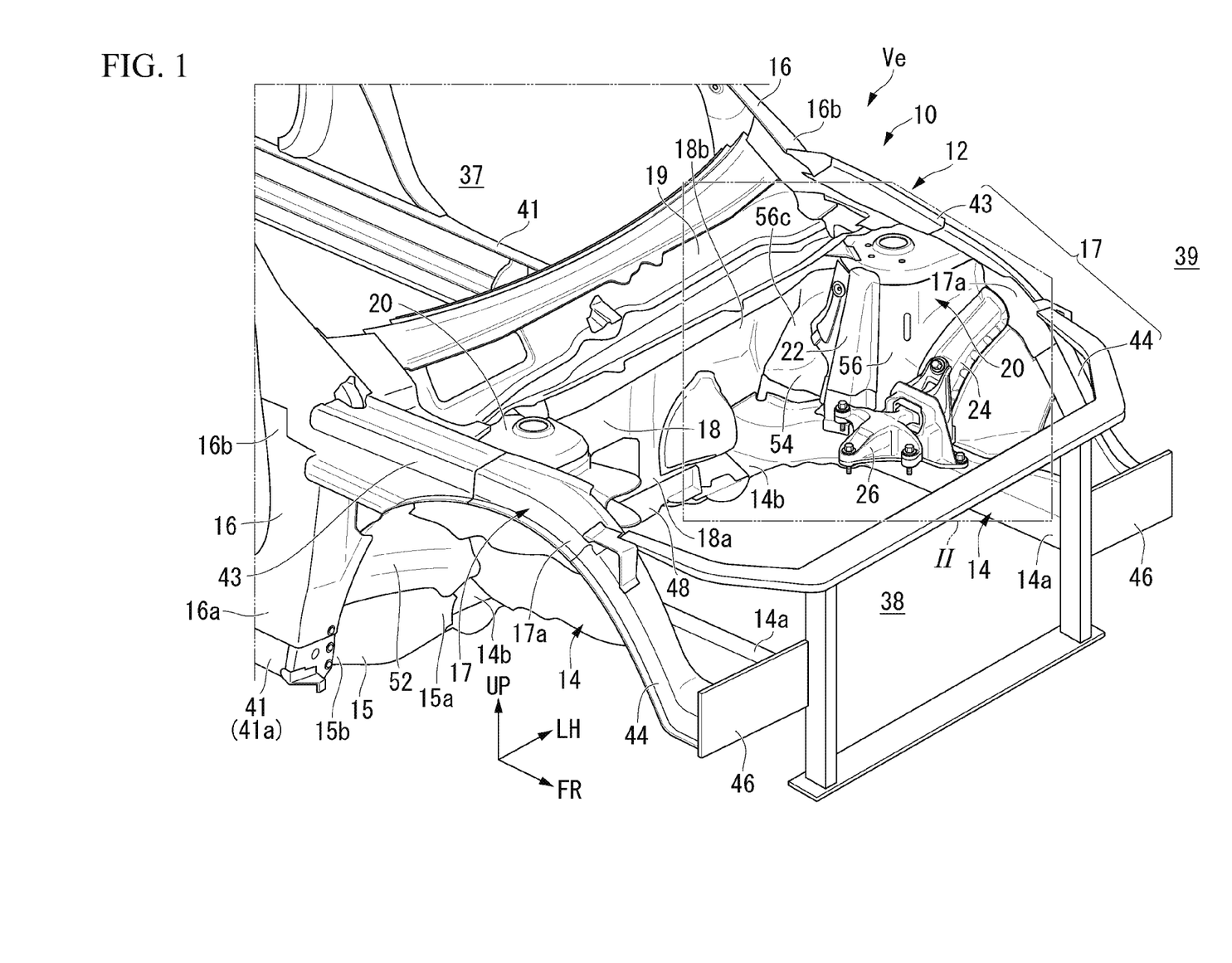
FIG. 1 is a perspective view showing a vehicle body front structure according to one embodiment of the present invention.

As shown in FIG. 1, a vehicle body 10 includes a vehicle body front structure 12 which constitutes a front section of the vehicle body 10. The vehicle body front structure 12 includes a front side frame 14, an outrigger 15 (also see FIG. 3), a front pillar 16, an upper member 17, a dash lower 18, a dash upper 19, a damper housing unit 20, and a reinforcing member 22, a cross member 24, and a mounting member 26.

Figure 2:
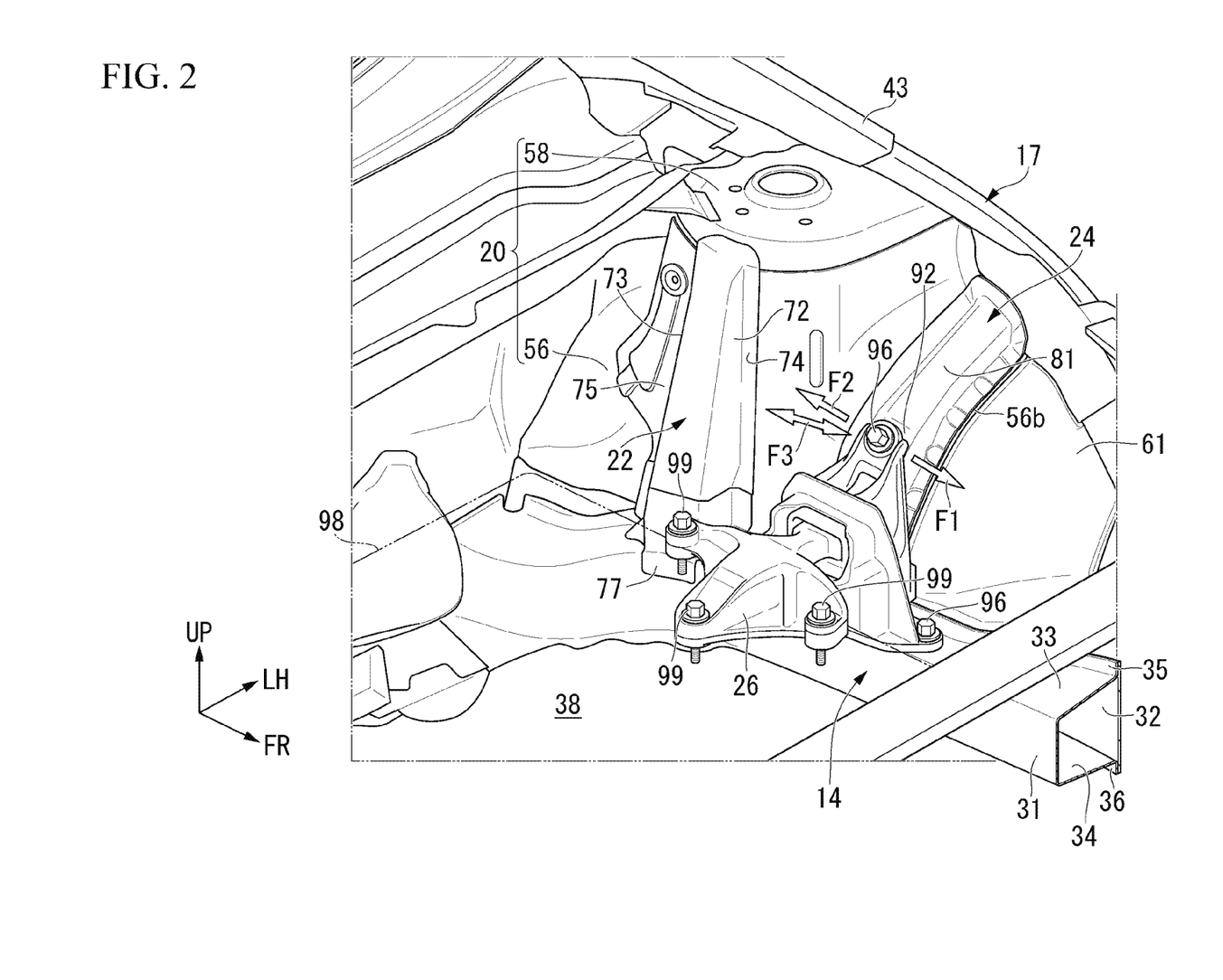
FIG. 2 is an enlarged perspective view showing a section II of FIG. 1 according to one embodiment of the present invention.
Figure 3:
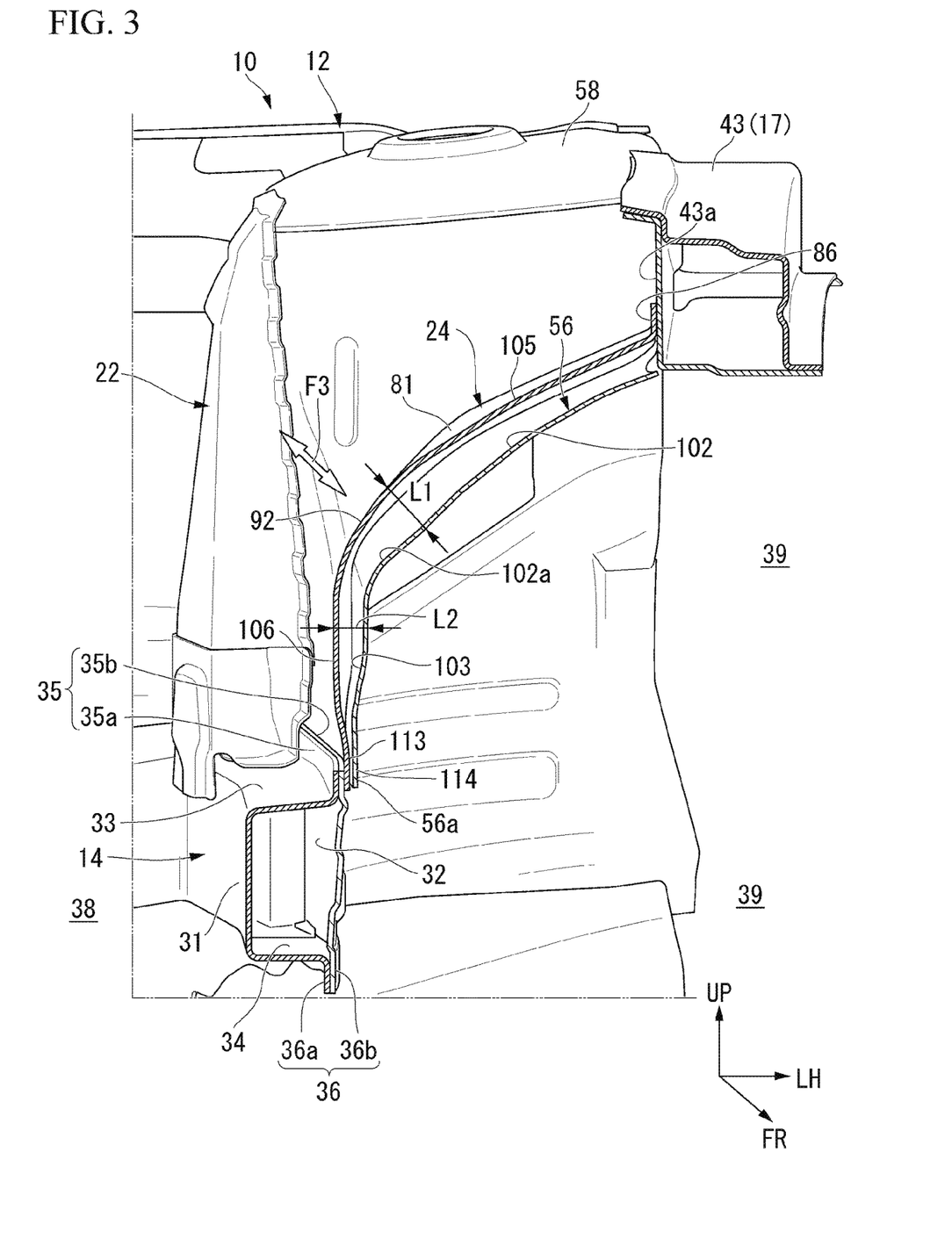
FIG. 3 is a perspective view showing a state cut along line of FIG. 4 according to one embodiment of the present invention.

As shown in FIGS. 2 and 3, the front side frame 14 is disposed on the left side in a vehicle width direction and extends in a longitudinal direction of the vehicle body. The front side frame 14 includes an inner wall 31, an outer wall 32, an upper portion 33, a lower portion 34, an upper flange 35, and a lower flange 36.

The inner wall 31 is vertically disposed to face an engine compartment 38 on an inner side in the vehicle width direction. The upper portion 33 is bent horizontally from an upper end portion of the inner wall 31 outward in the vehicle width direction. The lower portion 34 is bent horizontally from a lower end portion of the inner wall 31 outward in the vehicle width direction. A first upper projecting portion 35a is bent upward from an outer end portion of the upper portion 33. A first lower projecting portion 36a is bent downward from an outer end portion of the lower portion 34.

A second upper projecting portion 35b of the outer wall 32 is connected to the first upper projecting portion 35a. A second lower projecting portion 36b of the outer wall 32 is connected to the first lower projecting portion 36a. The outer wall 32 is vertically disposed to face the outside 39 of the vehicle. The front side frame 14 is formed to have a rectangular closed cross section surrounded by the inner wall 31, the outer wall 32, the upper portion 33 and the lower portion 34.

In addition, by connecting the first upper projecting portion 35a to the second upper projecting portion 35b, the upper flange 35 projecting upward along the outer wall 32 is formed. Similarly, by connecting the first lower projecting portion 36a to the second lower projecting portion 36b, the lower flange 36 projecting downward along the outer wall 32 is formed.

Thus, a high strength (rigidity) of the front side frame 14 is secured.

Returning to FIG. 1, an inner end portion 15a of the outrigger 15 (an inner end portion 15a of the outrigger 15 on the right side is shown) is connected to a rear end portion 14b of the front side frame 14. The outrigger 15 extends outward in the vehicle width direction to a front end portion 41a of a side sill 41. An outer end portion 15b of the outrigger 15 is connected to the front end portion 41a of the side sill 41.

The side sill 41 is provided on a left outer side in the vehicle width direction and extends in the longitudinal direction of the vehicle body. The side sill 41 is provided on the left outer side of a passenger compartment 37 in the vehicle width direction and is provided below the passenger compartment 37.

A lower end portion 16a of the front pillar 16 is connected to a front portion 41b of the side sill 41 and the outer end portion 15b of the outrigger 15.

The front pillar 16 is raised upward from the front portion 41b of the side sill 41 and the outer end portion 15b of the outrigger 15.

The upper member 17 extends from an upper front portion 16b of the front pillar 16 forward in the vehicle body. The upper member 17 is disposed outward from the front side frame 14 in the vehicle width direction to extend in the longitudinal direction of the vehicle body.

The upper member 17 includes a horizontal member 43 and a curved member 44. The horizontal member 43 extends substantially horizontally from the upper front portion 16b of the front pillar 16 forward in the vehicle body to a central portion 17a. The curved member 44 extends in a curved shape downward from the central portion 17a to a connecting member 46.

The connecting member 46 is attached to a front end portion 14a of the front side frame 14.

Therefore, the curved member 44 of the upper member 17 is connected to the front end portion 14a of the front side frame 14 via the connecting member 46.

A front cross member 48 is provided to extend between the rear end portion 14b of the left front side frame 14 and the rear end portion 14b of the right front side frame 14.

The dash lower 18 and the dash upper 19 are provided to extend between the left front pillar 16 and the right front pillar 16.

A lower end portion 18a of the dash lower 18 is connected to the front cross member 48. The dash lower 18 has a wheel house rear portion 52 at a left end portion thereof.

The wheel house rear portion 52 is a portion that forms a rear portion of a wheel house 54, and is formed to be recessed in a curved shape toward the passenger compartment 37 side. The wheel house 54 is formed of the wheel house rear portion 52, a damper housing unit 20, a damper housing extension portion (a wheel house front portion) 61, and the like. The wheel house 54 is a side wall that partitions the engine compartment 38 from the outside 39 of the vehicle. A front wheel is partitioned from the engine compartment 38 by the wheel house 54.

Figure 4:
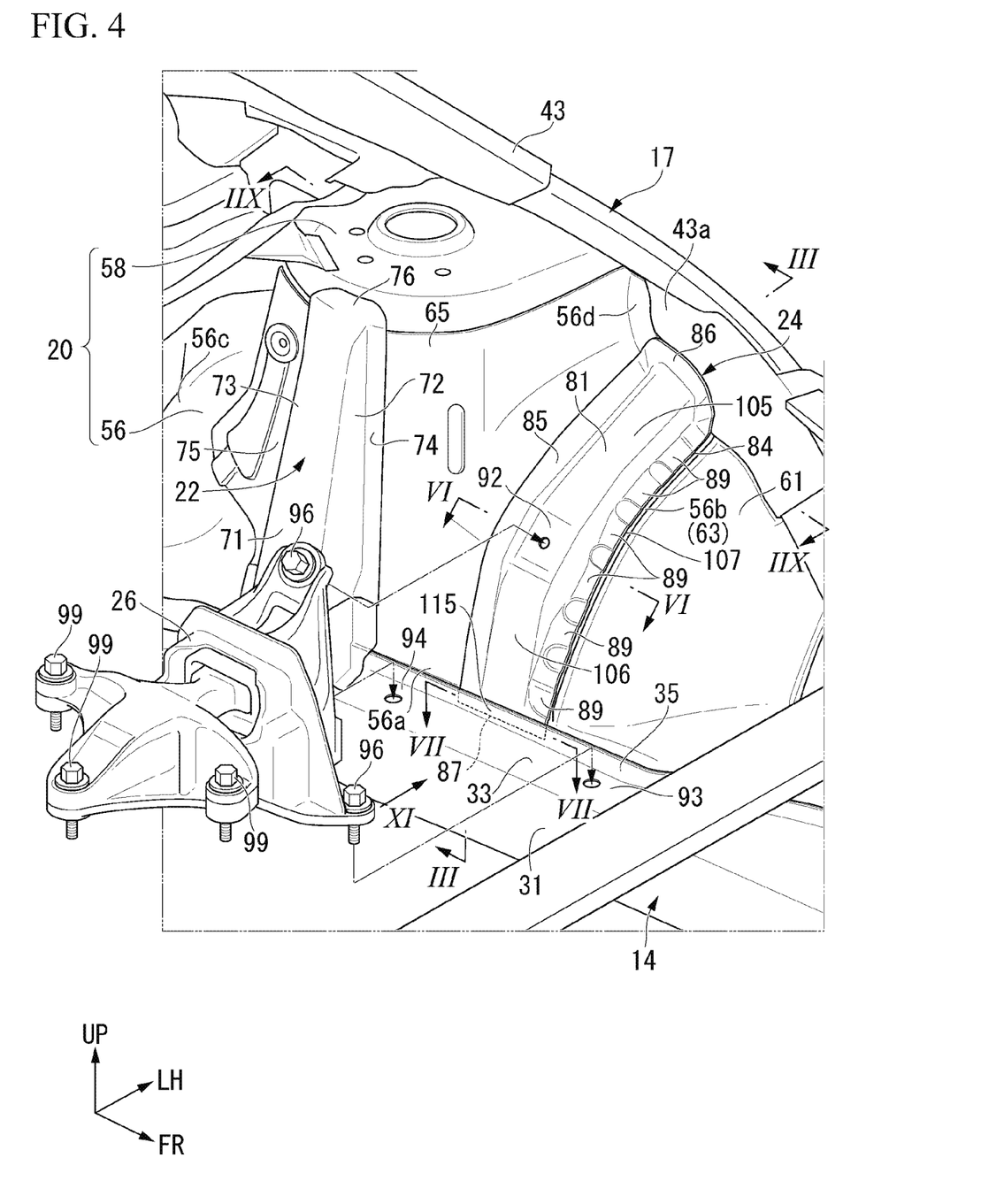
FIG. 4 is a perspective view showing a state in which a mounting member is removed from FIG. 2 showing the vehicle body front structure according to one embodiment of the present invention.
Figure 5:
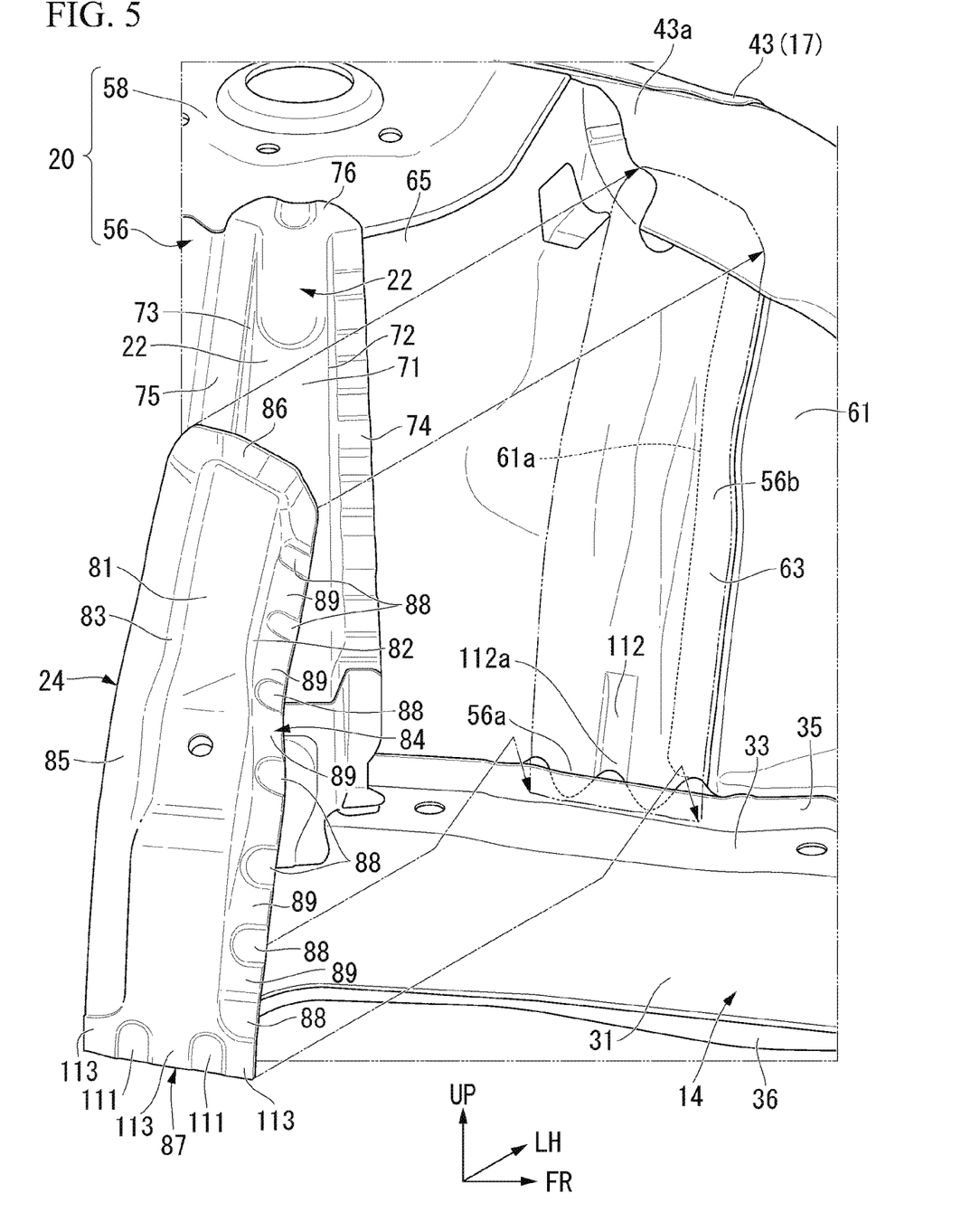
FIG. 5 is an exploded perspective view showing a cross member disassembled from FIG. 4 showing the vehicle body front structure according to one embodiment of the present invention.

As shown in FIGS. 4 and 5, the damper housing unit 20 is attached between the front side frame 14 and the horizontal member 43 of the upper member 17. The damper housing unit 20 includes a damper housing 56 and a damper base 58. The damper housing 56 is formed in substantially a U shape in the plan view to open outward in the vehicle width direction.

That is, the damper housing 56 is disposed between the front side frame 14 and the upper member 17. In addition, the damper housing 56 is disposed outward from the cross member 24 in the vehicle width direction. The damper housing 56 has a lower end portion 56a attached to the upper flange 35 of the front side frame 14. Specifically, the lower end portion 56a is attached to the upper flange 35 of the front side frame 14 via a lower member flange 87 of the cross member 24.

The damper housing 56 has a bead 112 at the lower end 56a. The bead 112 extends in a vertical direction, and a lower end portion 112a thereof is open.

The damper housing extension portion 61 is provided in front of the damper housing 56 in the vehicle body. A rear edge portion 61a of the damper housing extension portion 61 is connected to a front edge portion 56b of the damper housing 56 from an outward side in the vehicle width direction.

By connecting the front edge portion 56b of the damper housing 56 to the rear edge portion 61a of the damper housing extension portion 61, a housing connection portion 63 is formed by the front edge portion 56b and the rear edge portion 61a. By forming the housing connection portion 63 with two members of the front edge portion 56b and the rear edge portion 61a, the housing connection portion 63 is formed at a portion having a relatively high strength.

A rear edge portion 56c of the damper housing 56 is connected to the dash upper 19 and the wheel house rear portion 52 of the dash lower 18 (only the right wheel house rear portion 52 is shown in FIG. 1). A front outer edge portion 56d of the damper housing 56 is connected to an inner wall portion 43a of the horizontal member 43.

A substantially U-shaped opening portion 65 that opens outward in the vehicle width direction is formed at an upper end portion of the damper housing 56. The damper base 58 is connected to the opening portion 65. The damper base 58 has an outer edge portion 58a connected to the inner wall 43a of the horizontal member 43.

An upper end portion of a damper is attached to the damper base 58, and a wheel is connected to the damper.

The reinforcing member 22 is connected to an inner side of the damper housing 56 in the vehicle width direction. The reinforcing member 22 includes a reinforcing side wall 71, a reinforcing front wall 72, a reinforcing rear wall 73, a front connection flange 74, a rear connection flange 75, an upper connection flange 76, and a lower connection flange 77 (see FIG. 2).

The reinforcing side wall 71 is disposed inward from the damper housing 56 in the vehicle width direction with an interval therebetween. The reinforcing front wall 72 projects from a front side of the reinforcing side wall 71 toward the damper housing 56. Also, the reinforcing rear wall 73 projects from a rear side of the reinforcing side wall 71 toward the damper housing 56. Therefore, the reinforcing member 22 is formed in a U-shape in cross section by the reinforcing side wall 71, the reinforcing front wall 72, and the reinforcing rear wall 73.

The front connection flange 74 projects from an outer end of the reinforcing front wall 72 forward in the vehicle body along the damper housing 56 and the upper portion 33 of the front side frame 14. The front connection flange 74 is connected to the damper housing 56 and the upper portion 33 of the front side frame 14.

The rear connection flange 75 projects from an outer end of the reinforcing rear wall 73 rearward in the vehicle body along the damper housing 56 and the upper portion 33 of the front side frame 14. The rear connection flange 75 is connected to the damper housing 56 and the upper portion 33 of the front side frame 14.

The upper connection flange 76 projects from an upper end of the reinforcing side wall 71 along the damper base 58. The upper connection flange 76 is connected to the damper base 58.

The lower connection flange 77 (see FIG. 2) projects from a lower end of the reinforcing side wall 71 along the inner wall 31 of the front side frame 14. The lower connection flange 77 is connected to the inner wall 31 of the front side frame 14.

Therefore, the reinforcing member 22 is connected to the damper housing 56, the damper base 58, and the front side frame 14. Thus, the damper housing 56 and the front side frame 14 are reinforced by the reinforcing member 22.

The front edge portion 56b of the damper housing 56 and the rear edge portion 61a of the damper housing extension portion 61 are connected. The housing connection portion 63 is formed by the connected front edge portion 56b and rear edge portion 61a. The cross member 24 is connected to the housing connection portion 63 from an inner side in the vehicle width direction.

Figure 6:
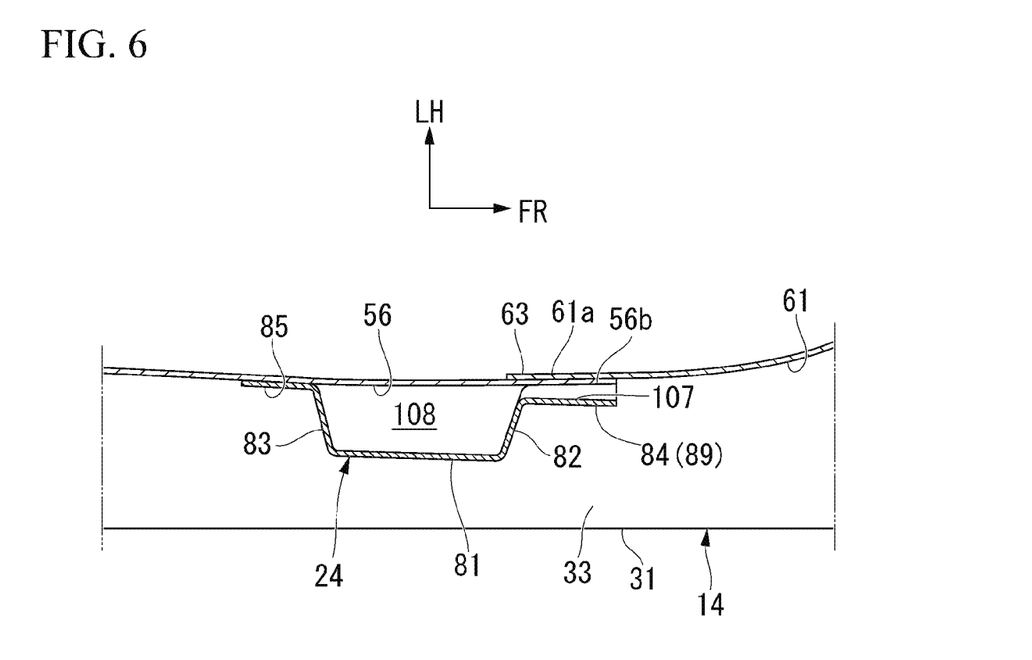
FIG. 6 is a cross-sectional view showing a state of being taken along line VI-VI of FIG. 4 according to one embodiment of the present invention.

As shown in FIGS. 5 and 6, the cross member 24 has a member side wall 81, a member front wall 82, a member rear wall 83, a front member flange (a front flange) 84, and a rear member flange (a rear flange) 85, an upper member flange 86 and a lower member flange 87.

The member side wall 81 is disposed inward from the damper housing 56 in the vehicle width direction with an interval therebetween. The member front wall 82 projects from a front side of the member side wall 81 toward the front edge portion 56b of the damper housing 56. Also, the member rear wall 83 projects from a rear side of the member side wall 81 toward the damper housing 56. Therefore, the cross member 24 is formed in a U-shape in cross section by the member side wall 81, the member front wall 82, and the member rear wall 83.

The front member flange 84 projects from an outer end of the member front wall 82 forward in the vehicle body along the front edge portion 56b (that is, the housing connection portion 63) of the damper housing 56. The front member flange 84 is connected to the front edge portion 56b (that is, the housing connection portion 63) of the damper housing 56 from the inner side in the vehicle width direction.

Specifically, in the front member flange 84, a plurality of first connection portions 88 and a plurality of first raised portions (longitudinal direction raised portions) 89 are alternately formed in the vertical direction along the front member flange 84. The plurality of first connection portions 88 are connected to the housing connection portion 63 by, for example, spot welding.

On the other hand, the plurality of first raised portions 89 are disposed with first intervals 107 with respect to the front edge portion 56b (that is, the housing connecting portion 63) of the damper housing 56.

The upper member flange 86 projects from an upper end of the member side wall 81 along the inner wall portion 43a of the upper member 17 (specifically, the horizontal member 43). The upper member flange 86 is connected to the inner wall portion 43a of the upper member 17.

Figure 7:
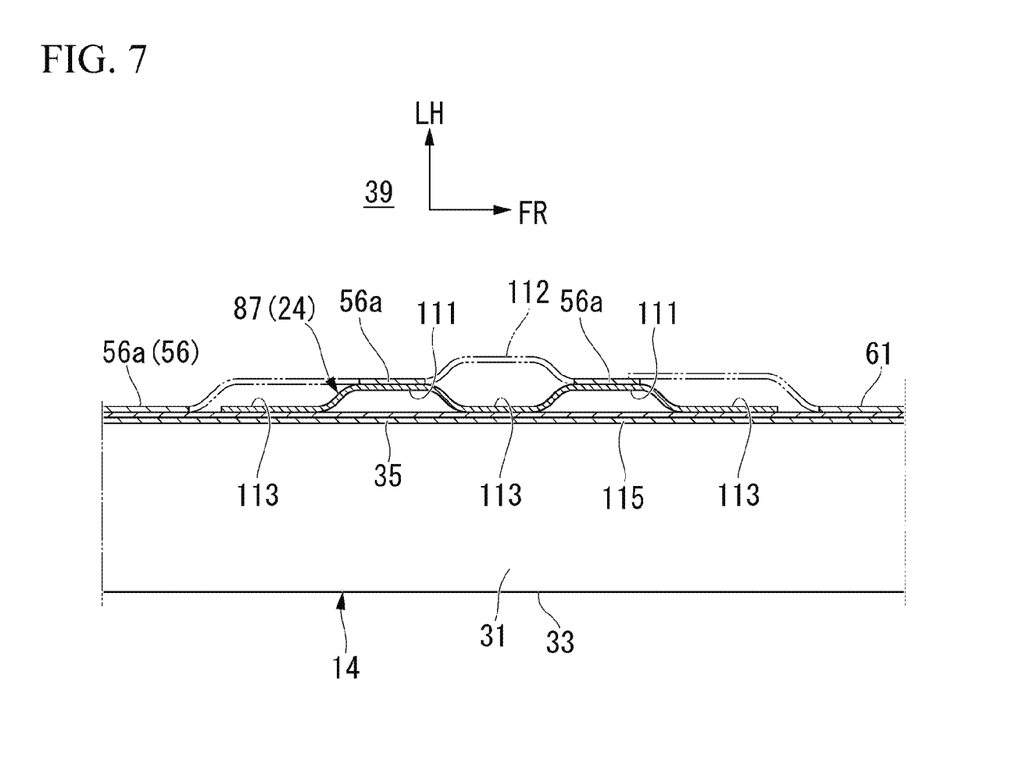
FIG. 7 is a cross-sectional view showing a state of being taken along line VII-VII of FIG. 4 according to one embodiment of the present invention.

As shown in FIGS. 5 and 7, the lower member flange 87 projects downward from lower ends of the member side wall 81, the front member flange 84, and the rear member flange 85. In the lower member flange 87, a plurality of second connection portions 111 and a plurality of second raised portions (raised portions) 113 are alternately formed along the lower member flange 87 in the longitudinal direction of the vehicle body. The plurality of second connection portions 111 are connected to the lower end portion 56a of the damper housing 56 by, for example, spot welding.

On the other hand, the plurality of second raised portions 113 are connected to an outer surface of the upper flange 35 of the front side frame 14 by, for example, spot welding.

Figure 8:
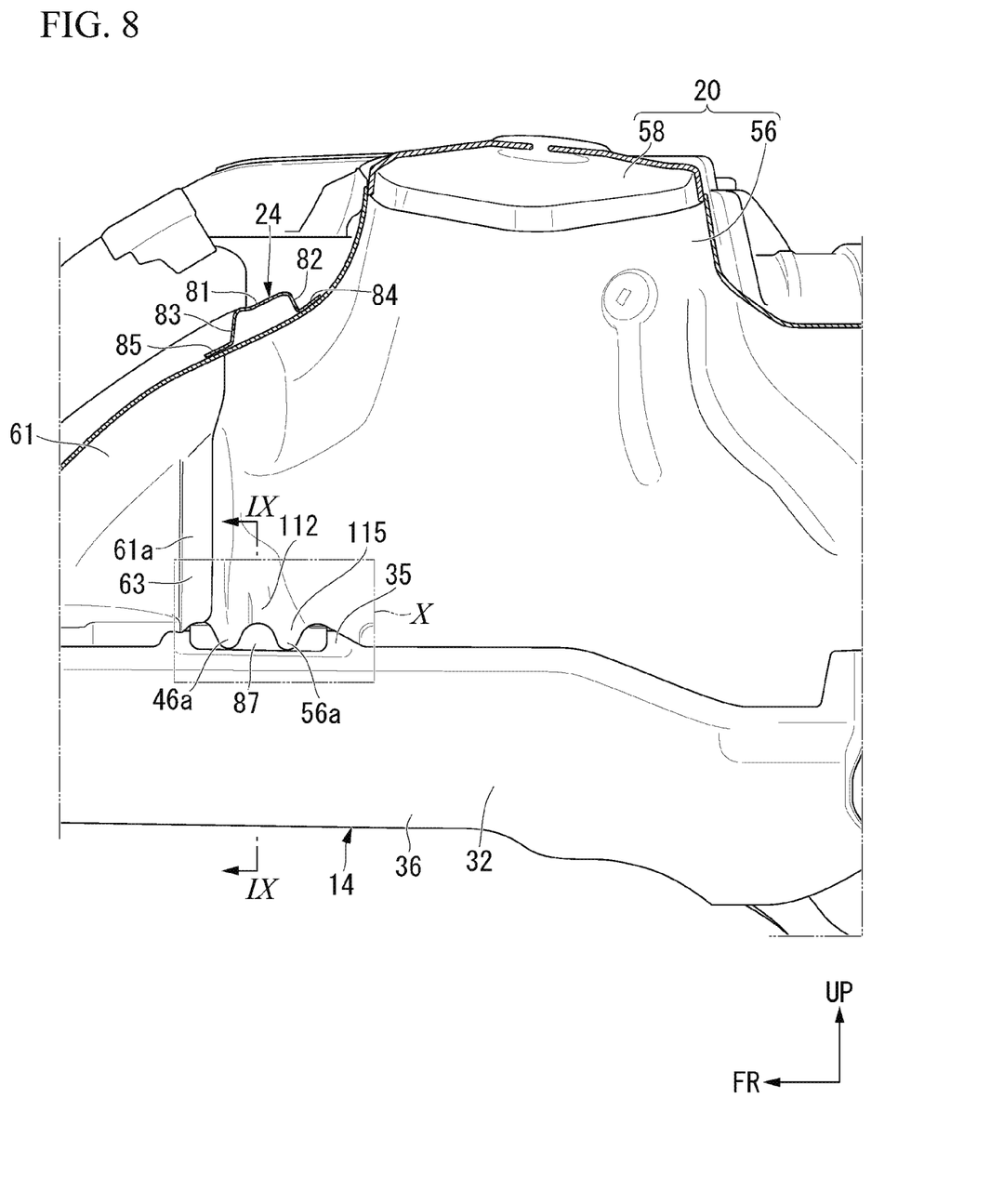
FIG. 8 is a side view showing a state of being taken along line IIX-IIX of FIG. 4 according to one embodiment of the present invention.
Figure 9:
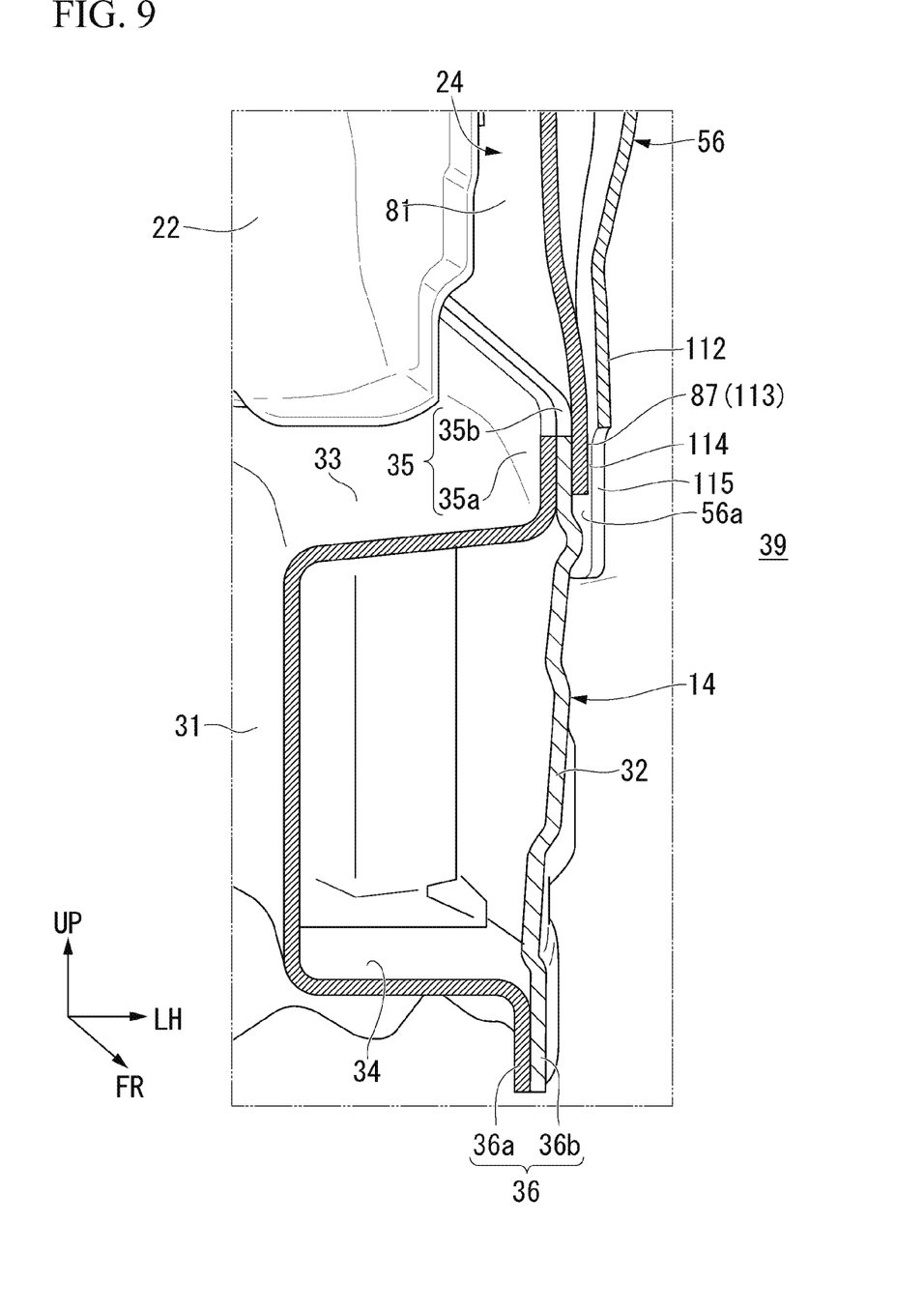
FIG. 9 is a cross-sectional view showing a state of being taken along line IX-IX of FIG. 8 according to one embodiment of the present invention.

As shown in FIGS. 8 and 9, the lower member flange 87 projects downward from the lower end of the member side wall 81, the lower end of the front member flange 84, and the lower end of the rear member flange 85 (see also FIG. 5). The lower member flange 87 projects downward along the outer surface of the upper flange 35 of the front side frame 14. The lower end portion 56a of the damper housing 56 comes into contact with the second connection portions 111 (see FIG. 7) of the lower member flange 87 from the outside 39 of the vehicle.

In this state, the plurality of second raised portions 113 are connected to the outer surface of the upper flange 35 of the front side frame 14 from the outside 39 of the vehicle. Also, the lower end portion 56a of the damper housing 56 is connected to the plurality of second connection portions 111 from the outside 39 of the vehicle.

That is, the lower member flange 87 and the lower end portion 56a of the damper housing 56 are connected to the upper flange 35 of the front side frame 14 from the outside 39 of the vehicle. Hereinafter, a portion in which the lower member flange 87, the lower end portion 56a of the damper housing 56, and the upper flange 35 of the front side frame 14 are connected is referred to as a frame connection portion 115.

Returning to FIGS. 4 and 6, the cross member 24 is connected to the damper housing 56, the housing connection portion 63, the inner wall portion 43a of the upper member 17, and the upper flange 35 of the front side frame 14. In this state, the cross member 24 extends in the vertical direction across the front side frame 14 and the upper member 17 (horizontal member 43) which are positioned at different heights, and extends in the vehicle width direction along a shape of the damper housing 56. In addition, the cross member 24 (specifically, the member side wall 81, the member front wall 82, and the member rear wall 83) and the damper housing 56 form a closed cross section.

Figure 10:
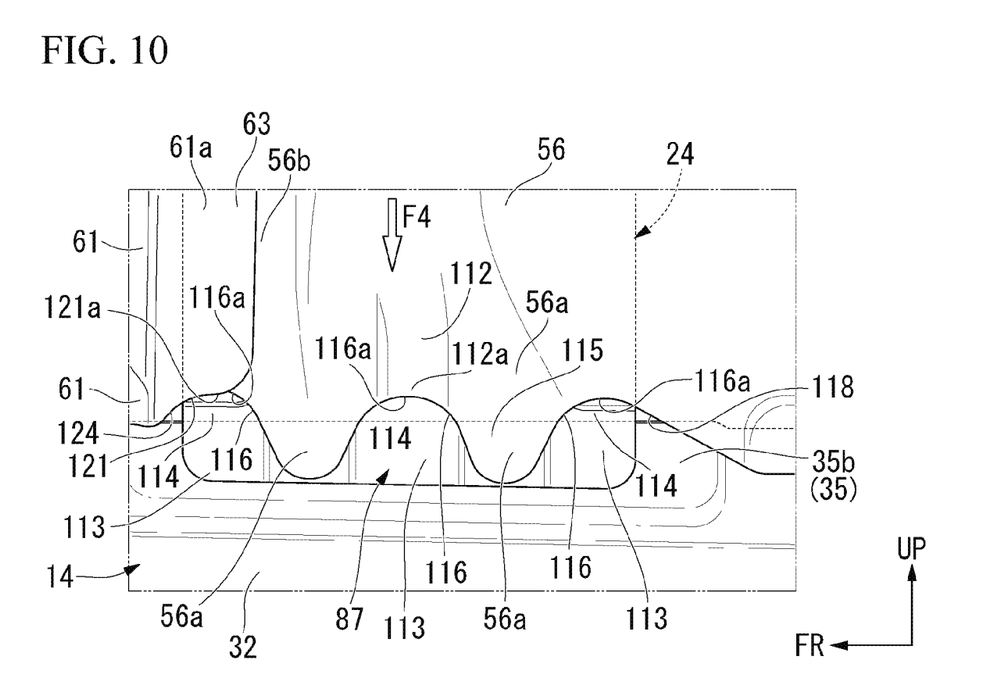
FIG. 10 is an enlarged side view showing a section X of FIG. 8 according to one embodiment of the present invention.

As shown in FIGS. 7 and 10, the second raised portions 113 are disposed with second intervals 114 with respect to the lower end portion 56a of the damper housing 56. Therefore, in the frame connection portion 115 a closed cross section is also formed by the lower end portion 56a of the damper housing 56 and the second raised portions 113 of the cross member 24. Thus, the closed cross section formed by the cross member 24 and the damper housing 56 is formed continuously from the frame connection portion 115 to the inner wall portion 43a of the upper member 17.

That is, strength (rigidity) of the cross member 24 is enhanced. As a result, the damper housing 56 and the damper housing extension 61 are reinforced by the cross member 24.

A shape of the closed cross section formed by the cross member 24 and the damper housing 56 will be described in detail later.

As shown in FIGS. 2 and 4, the cross member 24 has a first attachment portion (an attachment portion) 92. The front side frame 14 includes a second attachment portion 93 in front of the cross member 24 in the vehicle body and a third attachment portion 94 behind the cross member 24 in the vehicle body.

A mounting member 26 is attached to first attachment portion 92, the second attachment portion 93, and the third attachment portion 94 with bolts 96 and nuts. The mounting member 26 is a member that supports a drive source 98. That is, the drive source 98 is supported on the mounting member 26 using bolts 99. The drive source 98 supported by the mounting member 26 is disposed in the engine compartment 38.

Examples of the drive source 98 include a power unit and a motor in which an engine and a transmission are integrated.

As described above, the drive source 98 is supported by the mounting member 26, whereby a load from the drive source 98 is input via the mounting member 26 to the cross member 24 (specifically, the first attachment portion 92) of the damper housing 56. Specifically, loads F1 and F2 are input to the first attachment portion 92 of the cross member 24 in the longitudinal direction of the vehicle body, and a load F3 is input to a surface of the first attachment portion 92 (member side wall 81) in a direction orthogonal thereto.

For this reason, in order to support the drive source 98 with the cross member 24, it is required to secure strength against the loads F1 to F3 that are input from the two directions of the longitudinal direction of the vehicle body and the direction orthogonal to the member side wall 81 of the first attachment portion 92.

As shown in FIGS. 3 and 4, the member side wall 81 of the cross member 24 is formed such that a distance dimension L1 from the damper housing 56 increases in the first attachment portion 92. In addition, the member side wall 81 is formed such that a distance dimension L2 from the damper housing 56 is decreased downward from the first attachment portion 92.

Specifically, the damper housing 56 includes a damper inclined portion 102 and a damper vertical portion 103. The damper inclined portion 102 is formed in an inclined shape with a falling gradient inward in the vehicle width direction from the horizontal member 43 (inner wall portion 43a) of the upper member 17 to above the upper flange 35 of the front side frame 14. The damper vertical portion 103 is formed in a state of being inclined in a falling gradient slightly inward in the vehicle width direction with respect to a substantially vertical direction from an inner end portion 102a of the damper inclined portion 102 to above the upper flange 35 of the front side frame 14.

The member side wall 81 of the cross member 24 has a member inclined portion 105 and a member vertical portion 106. The member inclined portion 105 is disposed to have the distance dimension L1 with respect to the damper inclined portion 102. The member inclined portion 105 is formed along the damper inclined portion 102 to be in an inclined shape with a falling gradient inward in the vehicle width direction from the horizontal member 43 of the upper member 17 to the first attachment portion 92. The first attachment portion 92 is formed below the member inclined portion 105 and is disposed above the upper flange 35 of the front side frame 14.

The member vertical portion 106 is disposed to have the distance dimension L2 with respect to the damper vertical portion 103. The member vertical portion 106 is substantially vertically formed along the damper vertical portion 103 from the first attachment portion 92 to the upper flange 35 of the front side frame 14.

Here, the damper vertical portion 103 is formed in a state of being inclined in a falling gradient slightly outward in the vehicle width direction with respect to the substantially vertical direction from the first attachment portion 92 to the upper flange 35 of the front side frame 14. Therefore, the member vertical portion 106 is formed such that the distance dimension L2 from the damper housing 56 decreases downward from the first attachment portion 92.

As a result, strength of the cross member 24 is enhanced against the loads F1 and F2 (see FIG. 2) input in the longitudinal direction of the vehicle body in the member vertical portion 106 in which the distance dimension L2 from the damper housing 56 decreases.

On the other hand, the member inclined portion 105 is formed such that the distance dimension L1 from the damper housing 56 increases particularly in the first attachment portion 92. By increasing the distance dimension L1 between the member inclined portion 105 and the first attachment portion 92, strength of the cross member 24 against the load F3 input in a direction intersecting the surface of the first attachment portion 92 (member side wall 81) can be increased.

Therefore, the mounting member 26 (see FIG. 2) can be firmly supported by the first attachment portion 92 of the cross member 24. As a result, the drive source 98 can be favorably supported via the mounting member 26 at a portion of the damper housing 56 where the cross member 24 is provided.

Further, the closed cross section is formed by the cross member 24 and the damper housing 56 (see FIG. 6). The closed cross section formed by the cross member 24 and the damper housing 56 is formed from the upper flange 35 of the front side frame 14 to the inner wall portion 43a of the upper member 17 (horizontal member 43).

Here, the front side frame 14 and the upper member 17 are members forming the closed cross section that serve as a framework member of the vehicle body 10. Therefore, the front side frame 14 is a member having a high strength (rigidity). Further, the upper member 17 is also formed in a rectangular closed cross section and is a member having a high strength (rigidity).

The cross member 24 is connected to the front side frame 14 and the upper member 17. Therefore, the loads F1 and F2 (see FIG. 2) input to the cross member 24 in the longitudinal direction of the vehicle body and the load F3 input in the direction intersecting the surface of the first attachment portion 92 can be transmitted to the front side frame 14 and the upper member 17.

In particular, the closed cross section formed by the cross member 24 and the damper housing 56 continues to the front side frame 14. Therefore, the closed cross section (that is, the cross member 24) is reinforced by the front side frame 14.

Thus, strength of the cross member 24 is enhanced against the loads F1 and F2 input to the cross member 24 in the longitudinal direction of the vehicle body and the load F3 input in the direction intersecting the surface (member side wall 81) of the first attachment portion 92.

As shown in FIGS. 2 and 5, the front member flange 84 is connected to the front edge portion 56b (that is, the housing connection portion 63) of the damper housing 56 from the inner side in the vehicle width direction. The housing connection portion 63 is formed at a portion having a relatively high strength by the front edge portion 56b of the damper housing 56 and the rear edge portion 61a of the damper housing extension portion 61.

By connecting the front member flange 84 to the housing connection portion 63 having a relatively high strength, the cross member 24 is firmly supported by the housing connection portion 63. Thus, strength of the cross member 24 is enhanced against the loads F1 and F2 input to the cross member 24 in the longitudinal direction of the vehicle body and the load F3 input in the direction intersecting the surface of the first attachment portion 92.

As shown in FIGS. 6 and 7, in the cross member 24, the plurality of first raised portions 89 are disposed to have the interval with respect to the front edge portion 56b (housing connection portion 63) of the damper housing 56. That is, the first intervals 107 are secured between the first raised portions 89 and the housing connecting portion 63.

In addition, the plurality of second raised portions 113 are disposed to have an interval with respect to the lower end portion 56a of the damper housing 56.

Thus, when electrostatic painting is performed on the inside 108 of the closed cross section formed by the cross member 24 and the damper housing 56, an electropaint can favorably enter into the inside 108 of the closed cross section through the secured first intervals 107 and second raised portions 113.

As shown in FIG. 4, among the front member flange 84 and the rear member flange 85 of the cross member 24, the plurality of first raised portions 89 are formed only on the front member flange 84. Therefore, the rear member flange 85 of the cross member 24 is connected to the damper housing 56 in a state of being continued thereto. As a result, by continuously connecting the rear member flange 85 to the damper housing 56, a decrease in strength due to the plurality of first raised portions 89 formed in the front member flange 84 can be inhibited.

In addition, the front member flange 84 is connected to a relatively strong housing connection portion 63 (see also FIG. 5). Thus, even when the plurality of first raised portions 89 are formed on the front member flange 84, the front member flange 84 is firmly connected to the housing connection portion 63.

Figure 11:
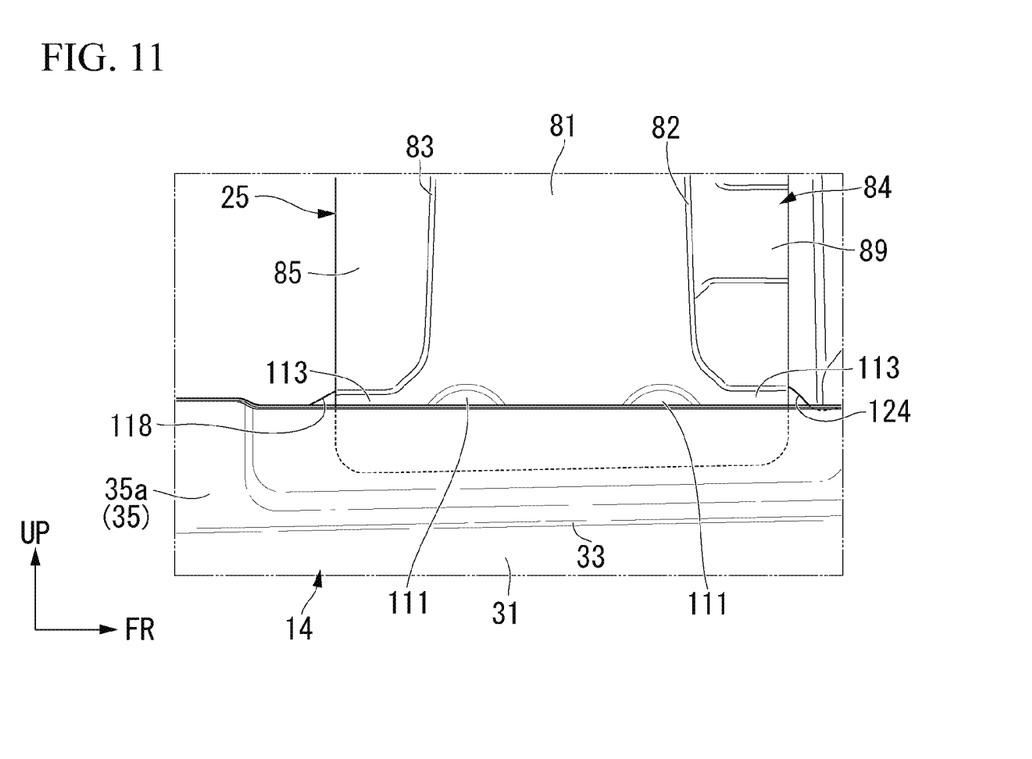
FIG. 11 is a side view seen in a direction of arrow XI of FIG. 4 according to one embodiment of the present invention.

As shown in FIGS. 10 and 11, in the damper housing 56, the lower end portion 56a is attached to the upper flange 35 of the front side frame 14 via the lower member flange 87 of the cross member 24. The damper housing 56 has the bead 112 at the lower end 56a. The bead 112 is formed to extend in the vertical direction, and the lower end portion 112a is open.

As described above, the bead 112 extending in the vertical direction is formed at the lower end portion 56a of the damper housing 56. The bead 112 is raised outward in the vehicle width direction. Therefore, a load F4 in the vertical direction can be supported by the bead 112. Thus, the strength of the damper housing 56 against the load F4 in the vertical direction can be enhanced by the bead 112.

A plurality of first recessed portions 116 that are recessed upward are formed at the lower end portion 56a of the damper housing 56. Top ends 116a of the first recessed portions 116 are disposed above the upper flange 35 of the front side frame 14. Therefore, a first space 118 is formed between the first recessed portion 116 positioned rearward in the vehicle body and an upper end of the upper flange 35. The first space 118 communicates with the second raised portions 113 (see FIG. 7).

A second recessed portion 121 is formed at a lower end of the rear edge portion 61a of the damper housing extension portion 61. The second recessed portion 121 is formed to be recessed upward. A top end 121a of the second recessed portion 121 is disposed at the same height as that of the top ends 116a of the first recessed portions 116. A second space 124 is formed between the second recessed portion 121 and the upper end of the upper flange 35 of the front side frame 14. The second space 124 communicates with the second raised portions 113 (see FIG. 7).

Here, the first recessed portions 116 and the second recessed portion 121 are formed at positions corresponding to the second raised portions 113 of the cross member 24. The second intervals 114 are formed by the first recessed portions 116 and the second raised portions 113. Similarly, the second intervals 114 are formed by the second recessed portion 121 and the second raised portions 113. Therefore, the inside 108 of the closed cross section formed by the cross member 24 and the damper housing 56 communicates with the outside via the second intervals 114.

Further, the second interval 114 positioned forward in the vehicle body communicates with the second space 124. Also, the second interval 114 positioned rearward in the vehicle body communicates with the first space 118.

In addition, the bead 112 of the lower end portion 56a of the damper housing 56 is formed at a portion corresponding to the first recessed portions 116. That is, the bead 112 is formed at a position corresponding to the second raised portions 113 of the cross member 24. Also, the bead 112 extends in the vertical direction and the lower end portion is formed to open to the second raised portion 113 side. Further, the bead 112 is raised outward in the vehicle width direction. Therefore, the inside 108 of the closed cross section formed by the cross member 24 and the damper housing 56 favorably communicates with the outside via the bead 112.

Thus, when electrostatic painting is performed on the inside 108 of the closed cross section formed by the cross member 24 and the damper housing 56, an electropaint can favorably enter into the inside 108 of the closed cross section through the first space 118 and the second space 124.

Next, an example in which an input load is supported by the cross member 24 when the load from the drive source 98 is input to the first attachment portion 92 of the cross member 24 through the mounting member 26 will be described with reference to FIG. 12.

Figure 12:
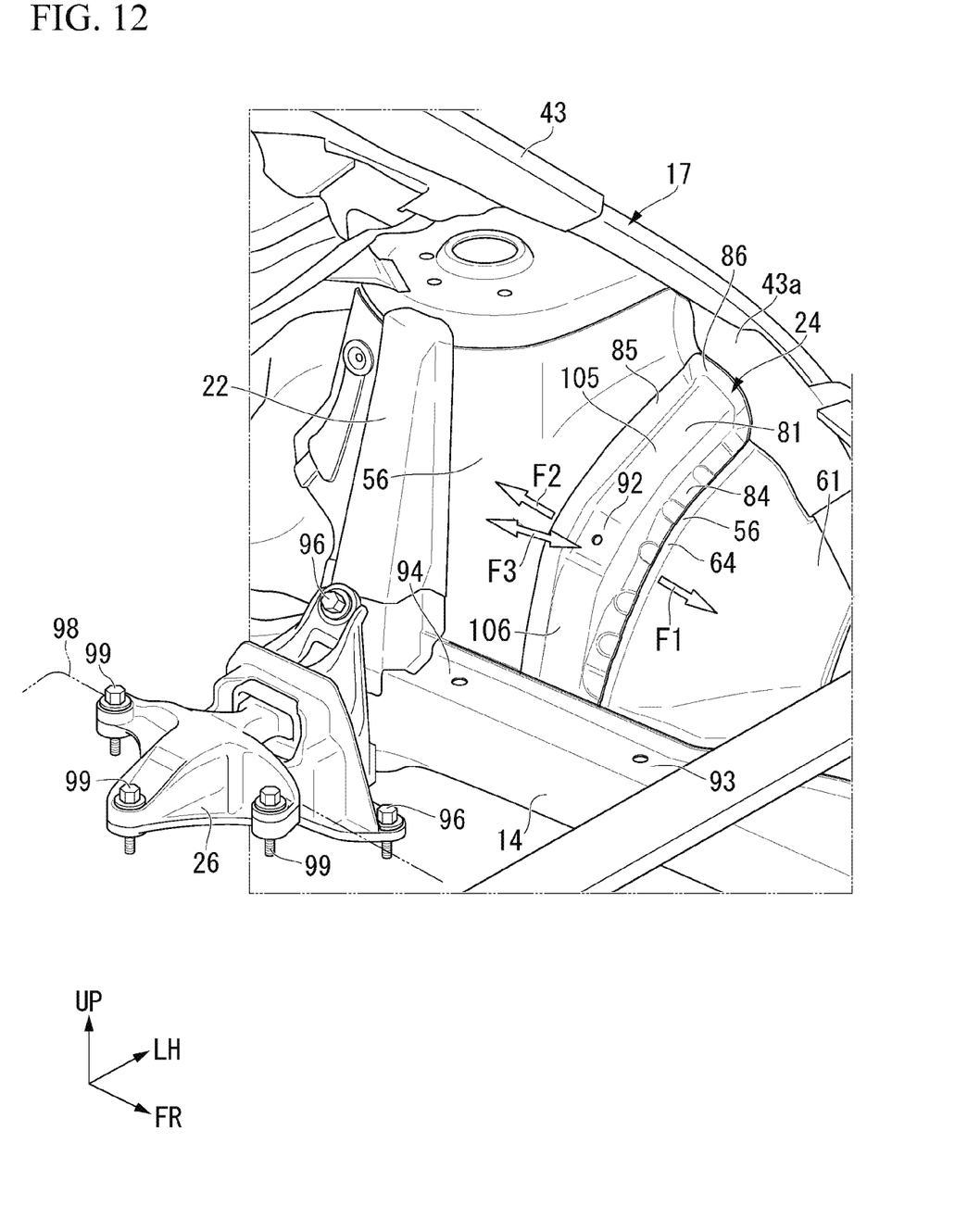
FIG. 12 is a perspective view for illustrating an example in which a load input from the mounting member is supported by the cross member in the vehicle body front structure according to one embodiment of the present invention.

As shown in FIG. 12, the cross member 24 and the damper housing 56 form the closed cross section. The mounting member 26 is attached to the first attachment portion 92 of the cross member 24 with the bolts 96 and the nuts. The drive source 98 is supported on the mounting member 26.

Therefore, the load from the drive source 98 is input to the cross member 24 of the damper housing 56 via the mounting member 26, the bolts 96, and the nuts. Specifically, with respect to the cross member 24, the loads F1 and F2 are input to the first attachment portion 92 in the longitudinal direction of the vehicle body (an arrow A direction). Further, the load F3 is input to the surface of the first attachment portion 92 (member side wall 81) in the direction orthogonal thereto.

The member vertical portion 106 is formed such that the distance dimension L2 (see FIG. 3) from the damper housing 56 decreases downward from the first attachment portion 92. Therefore, the strength of the cross member 24 is enhanced against the loads F1 and F2 in the member vertical portion 106 in which the distance dimension L2 from the damper housing 56 decreases.

On the other hand, the member inclined portion 105 is formed such that the distance dimension L1 (see FIG. 3) from the damper housing 56 increases particularly in the first attachment portion 92. By increasing the distance dimension L1 between the member inclined portion 105 and the first attachment portion 92, the strength of the cross member 24 against the load F3 input in the direction intersecting the surface of the first attachment portion 92 can be increased.

Therefore, the mounting member 26 can be firmly supported by the first attachment portion 92 of the cross member 24.

As a result, the drive source 98 can be favorably supported at the portion of the damper housing 56 where the cross member 24 is provided.

Further, the cross member 24 is connected to the front side frame 14 and the upper member 17. Therefore, the loads F1 and F2 input to the cross member 24 in the longitudinal direction of the vehicle body and the load F3 in the direction intersecting the surface of the first attachment portion 92 can be transmitted to the front side frame 14 and the upper member 17.

As a result, strength of the cross member 24 is enhanced against the loads F1 and F2 input to the first attachment portion 92 of the cross member 24 in the longitudinal direction of the vehicle body and the load F3 input in the direction intersecting the surface (member side wall 81) of the first attachment portion 92.

In addition, the front member flange 84 is connected to the front edge portion 56b (that is, the housing connection portion 63) of the damper housing 56 from the inner side in the vehicle width direction. The housing connection portion 63 is formed at the portion having a relatively high strength by the front edge portion 56b of the damper housing 56 and the rear edge portion 61a (see FIG. 5) of the damper housing extension portion 61.

Therefore, the cross member 24 is firmly supported by the housing connection portion 63.

As a result, strength of the cross member 24 is enhanced against the loads F1 and F2 input to the first attachment portion 92 in the longitudinal direction of the vehicle body and the load F3 input in the direction intersecting the surface (member side wall 81) of the first attachment portion 92.

Further, it should be understood that the technical scope of the present invention is not limited to the above-described embodiment, and various modifications can be made without departing from the spirit of the present invention.

For example, in the above-described embodiment, an example in which the plurality of first raised portions 89 are formed on the front member flange 84 has been described, but the present invention is not limited thereto. As another example, the plurality of first raised portions 89 may be formed on the rear member flange 85. In this case, an interval is secured between the first raised portions 89 and the damper housing 56.

REFERENCE SIGNS LIST

10 Vehicle body
12 Vehicle body front structure
14 Front side frame
17 Upper member
20 Damper housing unit
24 Cross member
26 Mounting member
56 Damper housing
56a Lower end portion of damper housing
56b Front edge portion of damper housing
61 Damper housing extension portion
61a Rear edge portion of damper housing extension portion
63 Housing connection portion
84 Front member flange (front flange)
85 Rear member flange (rear flange)
87 Lower member flange of cross member
89 First raised portion (longitudinal direction raised portion)
92 First attachment portion (attachment portion)
98 Drive source
112 Bead
113 Second raised portion (raised portion)
115 Frame connection portion
L1 Distance dimension

What is claim is:

1. A vehicle body front structure comprising:
   a front side frame extending in a longitudinal direction of a vehicle body;
   an upper member which is disposed outward from the front side frame in a vehicle width direction and extends in the longitudinal direction of the vehicle body;
   a damper housing disposed between the front side frame and the upper member; and
   a cross member which is connected to the damper housing to continuously form a closed cross section together with the damper housing and extends in a vertical direction across the front side frame and the upper member,
   wherein the cross member is attached to the front side frame via a lower member flange of the cross member,
   wherein the cross member has an attachment portion to which a mounting member supporting a drive source of a vehicle is attached, and is formed such that a distance dimension from the damper housing decreases downward from the attachment portion in the closed cross section, and
   wherein a plurality of raised portions are disposed at the lower member flange to have an interval.

2. The vehicle body front structure according to claim 1, wherein the closed cross section is formed from a frame connection portion between the damper housing and the front side frame toward the upper member.

3. The vehicle body front structure according to claim 1, wherein the damper housing is disposed outward from the cross member in the vehicle width direction to have a lower end portion thereof attached to a lower end portion of the cross member and the front side frame, and has a bead extending in the vertical direction at the lower end portion thereof.

4. A vehicle body front structure comprising:
   a front side frame extending in a longitudinal direction of a vehicle body;
   an upper member which is disposed outward from the front side frame in a vehicle width direction and extends in the longitudinal direction of the vehicle body;

a damper housing disposed between the front side frame and the upper member; and a cross member which is connected to the damper housing to continuously form a closed cross section together with the damper housing and extends in a vertical direction across the front side frame and the upper member, wherein the cross member has an attachment portion to which a mounting member supporting a drive source of a vehicle is attached, and is formed such that a distance dimension from the damper housing decreases downward from the attachment portion in the closed cross section, the vehicle body front structure further comprising:

a damper housing extension portion which is provided in front of the damper housing in the vehicle body and is connected to the damper housing, wherein the cross member includes a front flange projecting forward in the vehicle body, and the front flange is connected to a housing connection portion between the damper housing and the damper housing extension portion.

5. The vehicle body front structure according to claim 4, wherein the cross member includes a rear flange which projects rearward in the vehicle body and is connected to the damper housing, and has a longitudinal direction raised portion on one of the front flange and the rear flange.

6. The vehicle body front structure according to claim 3, wherein the bead at the lower end portion of the damper housing is formed at a position corresponding to a raised portion of the cross member, and a lower end portion of the bead is formed to open to a raised portion side.

* * * * *